Figure 1:
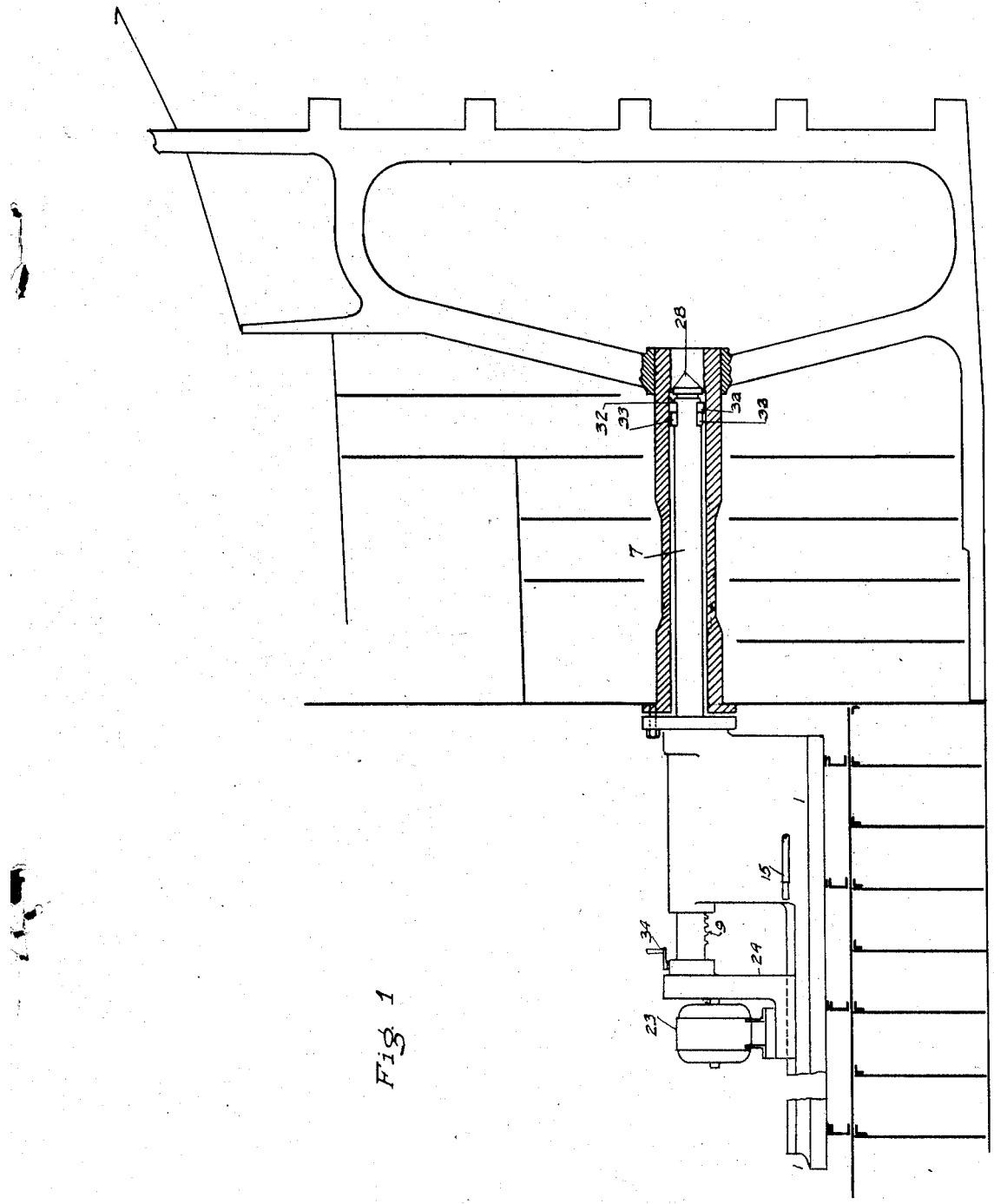

April 10, 1934.  E. A. ARP  1,954,034
EQUALIZING BORING GUIDE
Filed Oct. 15, 1930  5 Sheets-Sheet 1

INVENTOR
Ewald A. Arp

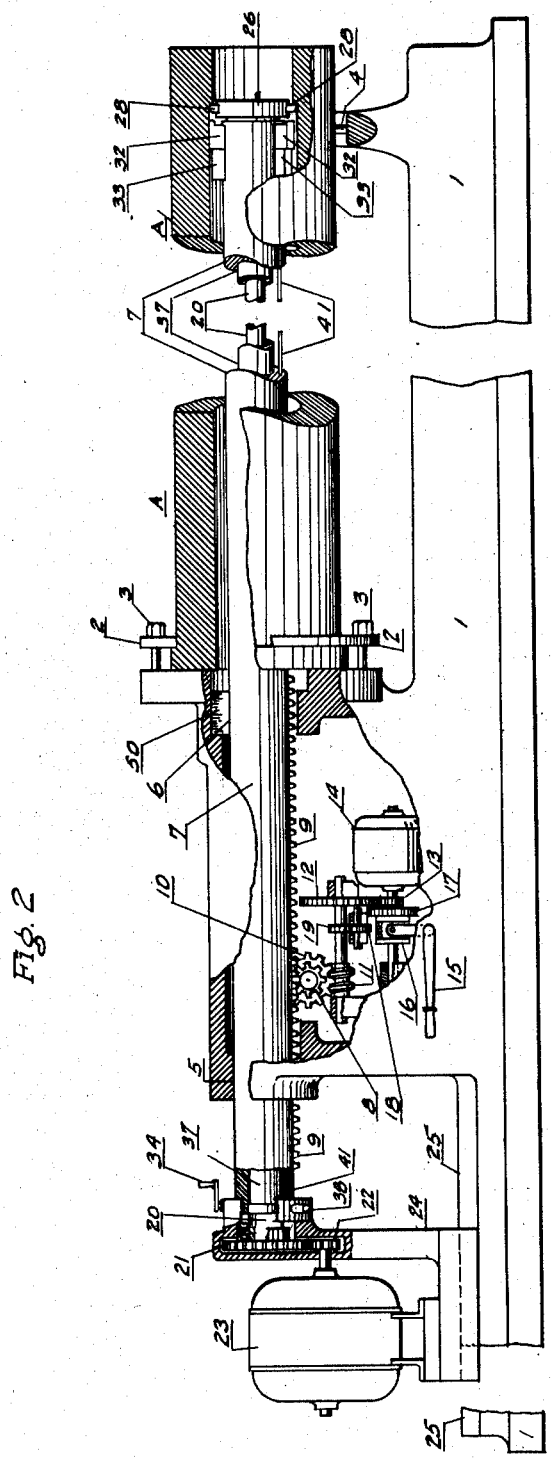

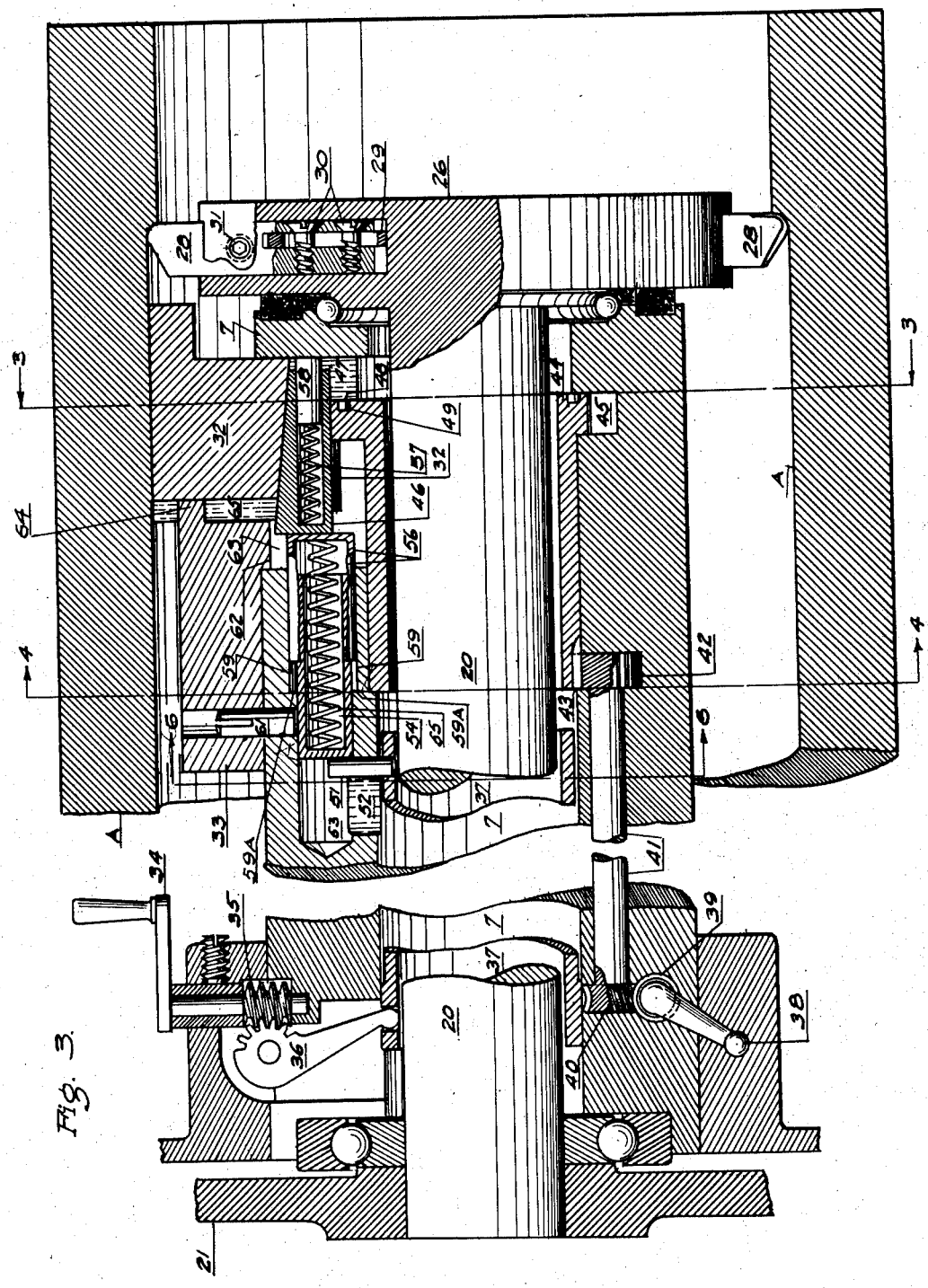

April 10, 1934.  E. A. ARP  1,954,034
EQUALIZING BORING GUIDE
Filed Oct. 15, 1930   5 Sheets-Sheet 4
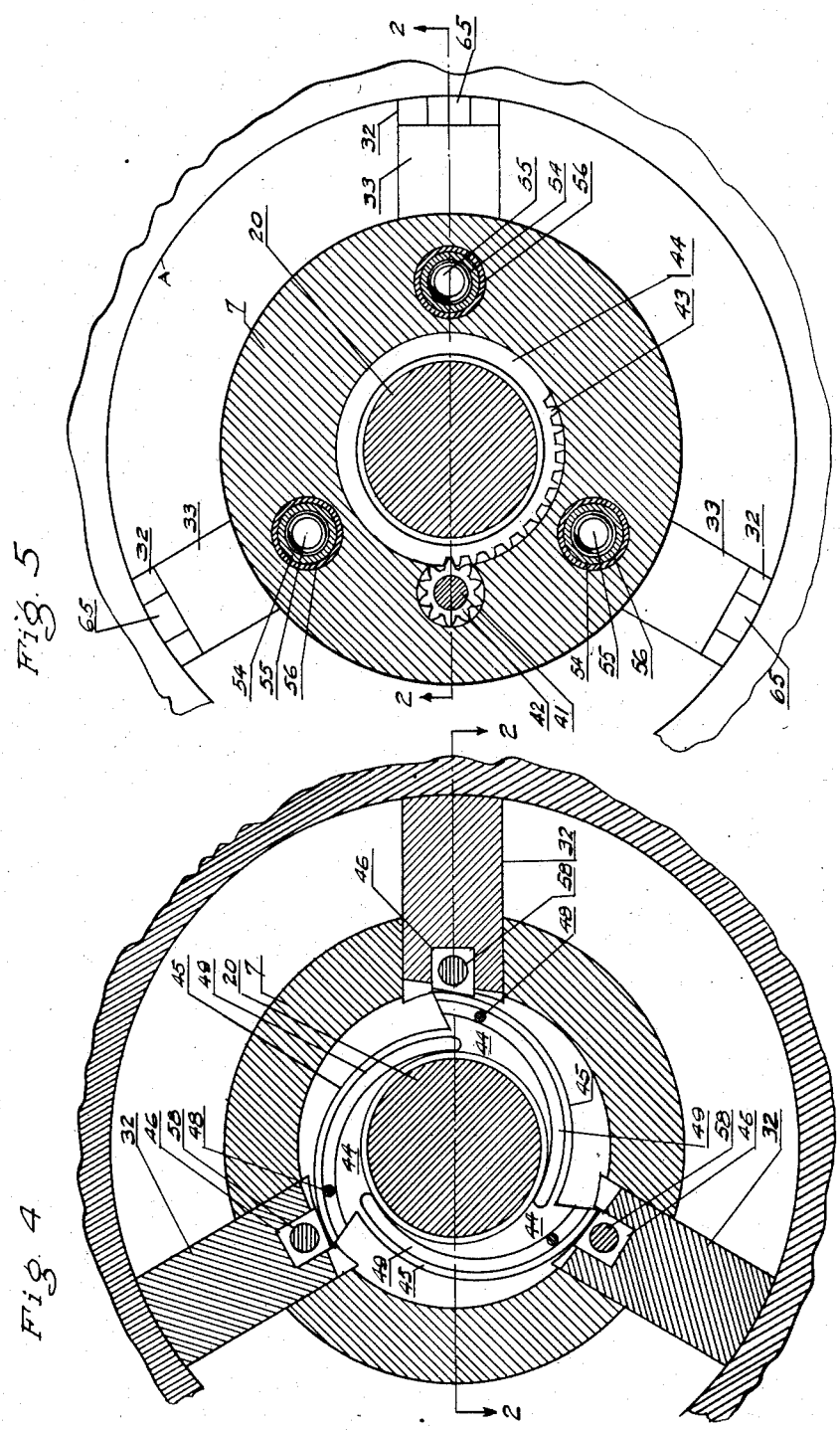
INVENTOR.
Ewald A. Arp April 10, 1934.    E. A. ARP    1,954,034
EQUALIZING BORING GUIDE
Filed Oct. 15, 1930    5 Sheets-Sheet 5
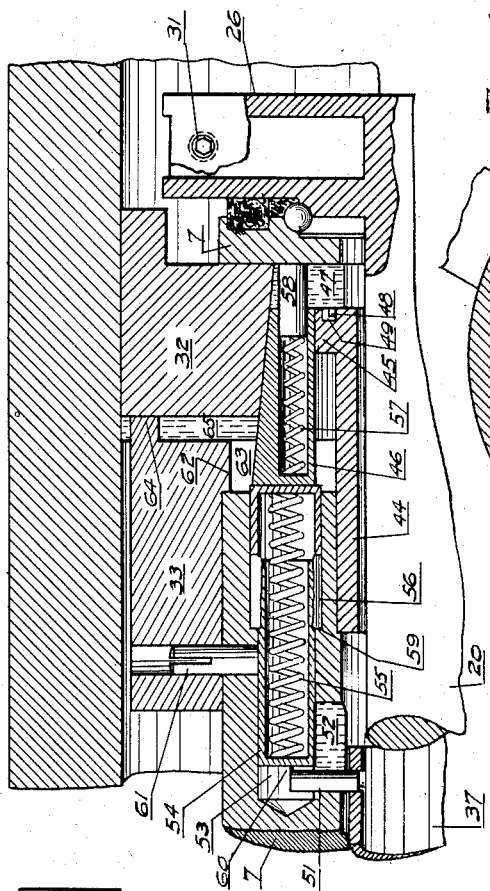
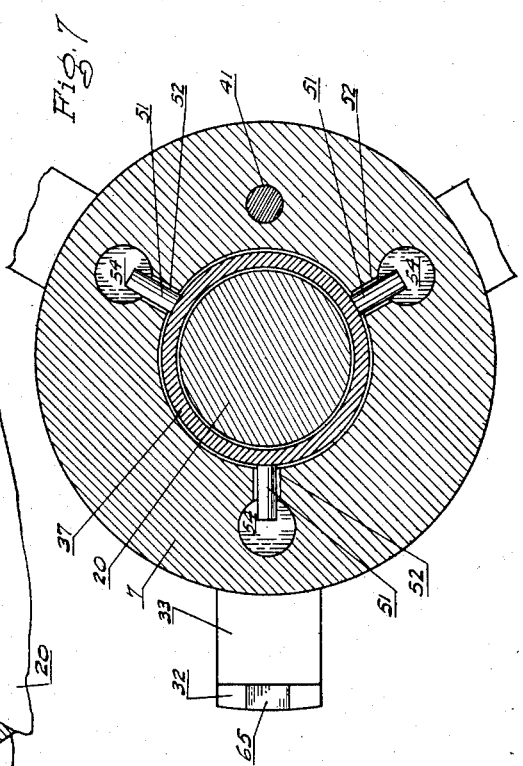
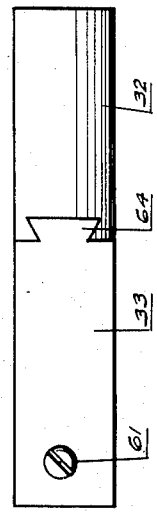
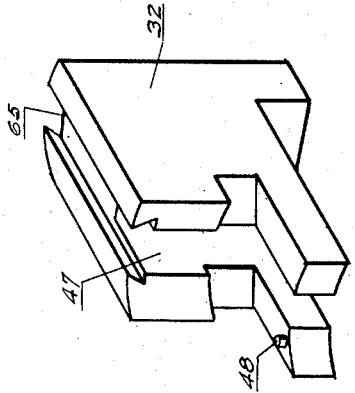
INVENTOR
Ewald A. Arp Patented Apr. 10, 1934

1,954,034

UNITED STATES PATENT OFFICE 1,954,034

EQUALIZING BORING GUIDE

Ewald A. Arp, Minneapolis, Minn., assignor to Van Norman Machine Tool Company, Springfield, Mass., a corporation Application October 15, 1930, Serial No. 489,005

3 Claims. (Cl. 77—3)

I call this invention an equalizing boring guide. My object in the device described more particularly herein is to provide improvements in machines for finishing the bore of cylinders. This invention is specifically an improvement on the reboring mechanism shown in my Patent No. 1,868,440, July 19, 1932. I claim the improvements herein submitted are valuable and will aid materially in the positive centering of a cutter head and in controlling the cutter head at all depths without outer supports.

The main object of this improvement is to provide a dual control for the guide members giving them a uniform and unyielding projection, forcing the work to be centered in relation to a cutter head, and projecting them under a uniform pressure to make contact and yield to conform to the finished portion of the bore being produced, and there becoming nonyielding to transverse distortive forces, but free to move longitudinally back of a rotating cutter head to produce accurate bores of any length.

This improvement is embodied as the controlling elements in the working construction of the machine shown in the accompanying drawings, the drawings being a part of this specification in which:

Figure 1 (Sheet 1) shows a preferred application of the machine, the drawing giving a longitudinal section of the stern of a steamer, with the machine installed in position for boring out the stern tube.

Figure 2 (Sheet 2) is a side elevation of the machine with work attached and cut away to show the location of the invention; the machine base is also cut away to show the feeding and driving mechanism for the cutter head. Figure 3 (Sheet 3) is a sectional view on an enlarged scale taken on the lines 2—2 of Figures 4 and 5 (Sheet 4) showing the construction of parts to control the guide members. Figure 4 (Sheet 4) is a view on the line 3—3 of Figure 3 (Sheet 3), showing the location of the operating cam and wedge blocks with the tubular guide sleeve and guide members in section. Figure 5 is a view mostly in section on the line 4—4 of Figure 3 (Sheet 3) showing the means of operating the cam. Figure 6 (Sheet 5) is a view in section, for comparison with Figure 3 (Sheet 3) showing the position of the parts when used for centering. Figure 7 is a view mostly in section taken on the line 6—6 of Figure 3, showing pins for compressing springs. Figure 8 is a perspective view of one of the expanding, centering guide members. Figure 9 shows a supporting member in connection with the guide member.

When the machine is mounted on the ship's structure, as shown in Figure 1 (Sheet 1), rigid connection to the work is secured, after alignment, by bolting the machine to the stern tube flange at the after peak bulkhead.

In the Figure 2 (Sheet 2) number 1 is a machine base showing the piece of work attached by the clamping ring 2 and the screws 3, the outer end of work being supported by suitable adjustments such as indicated at 4.

The base is provided with two bearings 5 and 6 in which is fitted the tubular guide sleeve 7 which has a longitudinal movement therein by the rotation of the pinion 8 moving gear rack 9, which is attached to sleeve 7; the pinion gear 8 may be rotated as suggested by the worm wheel 10 and the worm 11, the latter being turned through the gears 12 and 13 by the motor 14. The longitudinal movement of the tubular guide sleeve may be reversed and speeded up by moving the lever 15 downward causing the collar 16 to move the pinion 13 out of mesh with the gear 12, and causing gear 17 to mesh with the idler gear 18, which in turn meshes with gear 19, causing the worm 11 to be turned in the opposite direction at a higher rate of speed. Tubular guide sleeve 7 forms the housing and bearings for the cutter shaft 20, and a means of rotating same is shown by its attached gear 21 driven by the pinion 22 secured to the shaft of motor 23. The motor support base 24 shows a means of attaching the motor 23 to travel longitudinally with the guide sleeve 7, while resting on and sliding along the track 25 of base 1. The cutter shaft 20 has attached at its opposite end a cutter head 26 which may be provided with one or more adjustable tools as shown by the shank and cutting tip 28, Figure 3 (Sheet 3), with its adjusting slide 29 and lock screws 30, a screw 31 allows the adjusted tools to be removed for centering the work in relation to the cutter head 26 as will now be explained. With cutting tools 28 removed the head 26 is moved to enter the work to be cut, the expanding guide members 32 with their supporting blocks 33 also entering the inner portion of the work, the crank 34 having previously been rotated to cause the attached worm 35 to move the arm 36 to position the tube 37 as shown in Figure 6, (Sheet 5). With parts in this position the crank 38 with worm 39 attached is turned, causing rotation of the worm wheel 40 together with its shaft 41 and pinion 42; pinion 42 turns the gear 43, which is cut into the sleeve of cam 44. The rotation of cam 44 drives the expanding guide members 32 outwardly evenly and positively by the action of the cams 45 coming into contact with the adjusting wedge glocks 46 fitted into slot 47 formed in members 32. In this way work is centered in relation to the cutter head and with work properly centered it is secured to the base 1, as has been described. The expanding members 32 are retracted by turning the crank 38 in the opposite direction which moves the cams 45 in the opposite direction, pulling the expanding blocks inwardly by the action of the pins 48 in the grooves 49 of the cams 45. The cutter head 26 and expanding guide members 32 with their supporting blocks 33 are retracted from the bore of the work and enter into the slots 50 provided in the bearing 6, the adjusted tools are now inserted into the cutter head 26 and held in place for service by the screws 31. The two motors are now started which rotate the cutter shaft 20 with its cutter head 26 and feed them into the work to be cut. When the cutting tools 28 rotating with their head 26 have cut sufficiently, the expanding guide members 32 are again projected outwardly by turning the crank 38 and coming into contact with the finished portion of the bore but under no pressure. In this position the crank 34 is turned as far as it will go to cause the arm 36 to move the tube 37 to position shown in Figure 3, the pins 51, which are permanently fastened in tube 37, coming to rest at the ends of the slots 52 in the tubular guide sleeve 7, pins 51 projecting into the openings 53 to force the hollow cup shaped members 54 to compress the springs 55 by its telescoping action into the cup shaped members 56. The force due to the springs 55 is the only pressure exerted on cup shaped members 56, which rest on the wedge blocks 46, causing them to overcome force of springs 57 and move sufficiently to compensate for any inaccuracy of manufacture or any other variations between the several parts and to allow the expanding guide members 32 to conform to the finished portion of the bore under even pressure and to become fixed to control the cutter head. The springs 57 rest on pins 58 and have sufficient pressure to return the wedge blocks 46 to a uniform position controlled by the ends 59 of members 56, coming into contact with the shoulders 59A formed in tubular guide sleeve 7 as shown in Figure 6 (Sheet 5), which is the correct position for accurate centering. It will be noticed that when tube 37 and the pins 51 are in the position shown in Figure 6, the springs 55 are released of all compression indicated by the openings 60 between the pins 51 and the cup shaped members 54. The supporting blocks 33 are held in position on the tubular guide sleeve 7 by a split friction pin 61 and the ends 62 projecting into the openings 63 in the sleeve 7, the supporting blocks 33 have dove-tail projections 64, which fit and slide in a corresponding slot 65, Figure 8 (Sheet 5) in the expanding guide members 32 to hold them steady in operation.

What I desire to cover with claims to secure Letters Patent for the United States is the combination of the following parts. The cams 45 operating against wedge blocks 46 uniformly positioned by the springs 57 allowing the uniform and positive projection of the expanding guide members 32 for centering the surrounding work, the members 54 and 56 together with the compression spring 55 providing the equalizing action, allowing the expanding guide members to be expanded into contact with and to conform to, the finished portion of the bore as produced, to constitute an accurate aligning nonrotating, nonyielding follow or steady guide to follow a cutter head and control same at any distance from its starting bearings. These parts constitute the unit of my invention when nested in the foregoing construction.

Having thus described my invention, what I claim is:

1. A boring tool comprising a boring bar, a cutting tool mounted on the bar for rotation therewith, a plurality of guide members mounted on the bar so as to permit the latter to rotate relatively to them, mechanism for adjusting the members simultaneously and positively in a direction radial with respect to the bar, and mechanism operable independently of and subsequent to the positive adjustment for exerting a further radial take-up force on the guide members, said last named mechanism including wedge surfaces engageable between the members and the adjusting mechanism, a spring device operable when compressed to force the wedge surfaces into wedging engagement with the members, and a manual control operable to compress the spring device and hold it under compression during the operation of the boring bar.

2. A boring tool comprising a boring bar, a cutting tool mounted on the bar for rotation therewith, a plurality of guide members mounted on the bar so as to permit the latter to rotate relatively to them, a rotatable cam having surfaces corresponding to each of the guide members, a wedge block located between each guide member and the corresponding surface of the cam so as to form normally a spacer between the cam and the guide member, operator-controlled means for rotating the cam, a pressure member including a compressible spring engageable with each of the wedge blocks, to force them into further wedging engagement with the guide members, and operator-controlled means for compressing said spring.

3. A boring tool comprising a boring bar, a cutting tool mounted on the bar for rotation therewith, a plurality of guide members mounted on the bar so as to permit the latter to rotate relatively to them, mechanism for expanding the members simultaneously and positively with respect to the bar to a desired radial diameter and for restraining said members against radial contraction within that diameter when so expanded, separate means for effecting by spring pressure a small further irreversible radial expansion of the guide members, and means operable independently of and subsequently to said positive adjustment and from a point outside the bore with which the guide members are engaged for actuating said separate means.

EWALD A. ARP.